(12) United States Patent
Gong

(10) Patent No.: US 10,173,721 B2
(45) Date of Patent: Jan. 8, 2019

(54) STEERING MOTOR

(71) Applicant: SHENZHEN ZHIXING SINGLE-AXLE TWO-WHEELED DRIVING TECHNOLOGY CO., LTD, Shenzhen, Guangdong (CN)

(72) Inventor: Shugang Gong, Shenzhen (CN)

(73) Assignee: SHENZHEN ZHIXING SINGLE-AXLE TWO-WHEELED DRIVING TECHNOLOGY CO., LTD, Shenzhen, Guangdong (CN)

( * ) Notice: Subject to any disclaimer, the term of this patent is extended or adjusted under 35 U.S.C. 154(b) by 224 days.

(21) Appl. No.: 15/300,585

(22) PCT Filed: Mar. 31, 2014

(86) PCT No.: PCT/CN2014/074348
§ 371 (c)(1),
(2) Date: Sep. 29, 2016

(87) PCT Pub. No.: WO2015/149209
PCT Pub. Date: Oct. 8, 2015

(65) Prior Publication Data
US 2017/0106901 A1 Apr. 20, 2017

(51) Int. Cl.
*B62D 5/04* (2006.01)
*B62D 5/06* (2006.01)
(Continued)

(52) U.S. Cl.
CPC ........... *B62D 5/062* (2013.01); *B62D 5/0418* (2013.01); *B62D 7/02* (2013.01); *F15B 15/22* (2013.01)

(58) Field of Classification Search
CPC ...... B62D 5/04; B62D 5/0418; B62D 5/0403; B62D 5/06; B62D 7/22; F15B 15/22
(Continued)

(56) References Cited

U.S. PATENT DOCUMENTS 2,589,341 A * 3/1952 Chisholm, Jr. ....... B64C 25/505
180/429
4,632,641 A 12/1986 Liska
(Continued)

FOREIGN PATENT DOCUMENTS

CN 2685610 3/2005
CN 201202640 3/2009
(Continued)

OTHER PUBLICATIONS

International Search Report for PCT/CN2014/074348, dated Nov. 26, 2014, 5 pages including English translation.

*Primary Examiner* — Ruth Ilan
(74) *Attorney, Agent, or Firm* — Hamre, Schumann, Mueller & Larson, P.C.

(57) ABSTRACT

Disclosed is a steering motor, comprising a spring damping valve, and an oil distributor which is fitted with the spring damping valve to form a cavity in which a buffering assembly is provided. A cylinder assembly is provided on a lower side of the oil distributor, and comprises a cylinder, an elastic oil bag provided in the cylinder, and a piston which is provided in the cylinder and fixedly connected to the elastic oil bag, the piston being capable of sliding axially along the cylinder. In addition, the oil distributor is further provided with an oil flow passage; the spring damping valve protrudes out of a hollow column having an inner cavity; a directional control valve having a valve core is inserted in the cavity of the hollow column; the hollow column is further provided with an oil flow port in communication with the oil flow passage; an oil inlet groove is provided on and in communication with the oil flow port; and the valve core protrudes into the hollow column and is fitted with the oil flow port and the oil inlet groove. The steering motor adopts an oil passage combination design to simplify the structure, and also adopts the elastic oil bag to reduce the (Continued)

frictional wear of a shock absorption mechanism, so as to prolong the service life of steering motor and reduce the costs.

13 Claims, 6 Drawing Sheets

(51) Int. Cl.
*F15B 15/22* (2006.01)
*B62D 7/02* (2006.01)

(58) Field of Classification Search
USPC .............................................. 92/8, 9
See application file for complete search history.

(56) References Cited

U.S. PATENT DOCUMENTS

| | | | | |
|---|---|---|---|---|
| 2017/0110926 A1* | 4/2017 | Gong | ................ | H02K 7/14 |
| 2017/0110931 A1* | 4/2017 | Gong | ................ | H02K 5/24 |

FOREIGN PATENT DOCUMENTS

| | | | | |
|---|---|---|---|---|
| CN | 202117920 | | 1/2012 | |
| CN | 202187912 | | 4/2012 | |
| CN | 103291613 | | 9/2013 | |
| FR | 2897399 A1 * | | 8/2007 | ......... F04C 15/0049 |

* cited by examiner

STEERING MOTOR

FIELD OF THE INVENTION

The present application relates to the technical field of motor structures, especially to a steering motor.

BACKGROUND OF THE INVENTION

With continuous development of automobile industry, steering systems of automobiles have obtained rapid progresses, and an electric power steering system is the development direction of automobile steering systems. The steering power of the system is directly provided by a steering motor some components required by traditional hydraulic power steering systems are then omitted, and hence not only is energy saved but also the environment is protected. Furthermore, the system further has features that it is easy to be adjusted and flexible to be assembled and the steering power can be provided under various circumstances.

When a driver operates a steering wheel to veer, a torque sensor detects the veer of the steering wheel and the extent of the torque, and transmits a voltage signal to an electronic control unit. The electronic control unit sends an instruction to a steering motor controller according to the torque voltage signal, the steering direction, and the automobile speed signal detected by the torque sensor, and makes the steering motor output a steering power torque with corresponding magnitude and direction, thereby producing auxiliary power. When the automobile does not veer, the electronic control unit will not send any instruction to the motor controller, and the motor does not work.

When a vehicle runs on a road with bad road conditions, the whole vehicle shakes with the steering motor continuously. In order to overcome the bad influence that the bad road conditions cause shocks of the steering motor, a damping system is arranged inside the steering motor. A traditional damping system generally utilizes a carbon brush and a collector ring; when the steering motor suffers shocks, the damping system begins to work and constantly buffers the shocks, which makes the carbon brush and the collector ring be rubbed continuously, hence the carbon brush and the collector ring may be worn and damaged due to friction. Furthermore, the carbon brush and the collector ring are sensitive to temperature, and are prone to damage because of temperature changes, such that the stability and service life of the steering motor are seriously affected.

In addition, existing steering motors are generally provided with a variety of oil passages, such as oil passages for shock absorption oil supply, oil passages for braking oil supply, oil passages for hoist oil supply, etc; however, these oil passages are all designed independently and assembled separately, such that each of the oil passages are isolated from each other. Thus, the oil passages occupy too much space in the steering motor, such that the structure of the steering motor is complex, which not only wastes resources but also increases manufacturing cost.

SUMMARY OF THE INVENTION

Technical Problems

A purpose of the present application is to provide a steering motor, and aims to overcome the following defects existing in the steering motor in the prior art:

1) Each of the oil passages inside the steering motor is designed independently, which occupies a relatively large inner space in the steering motor, makes the structure of the steering motor be complicated, and increases the volume thereof, thereby wasting resources and increasing manufacturing cost.

2) Furthermore, in a cylinder assembly inside the steering motor, structures of some components are worn and damaged due to constant friction, and the temperature changes make the structure be damaged, thereby affecting the stability and service life of the steering motor.

Technical Solutions

A technical solution provided by the present application is that: a steering motor includes a spring damping valve and an oil distributor; the oil distributor is arranged under the spring damping valve and fitted with the spring damping valve to form a cavity; a buffering assembly is arranged inside the cavity;

a cylinder assembly is fixedly arranged under the oil distributor; the cylinder assembly includes a cylinder with openings defined at two ends thereof, and an elastic oil bag arranged in the cylinder and defining an opening at an upper end thereof; the upper end of the elastic oil bag is fixedly connected to an inner wall of the cylinder and communicated with the cavity; the cylinder is further provided therein with a piston that slides axially along the cylinder; the piston is connected to a lower end of the elastic oil bag;

the oil distributor is provided with an oil flow passage arranged radially and in communication with the cavity; a hollow column that is arranged axially extends outwards at a lower end of the spring damping valve; the hollow column is provided with an inner cavity and a sidewall of the hollow column is provided with an oil flow opening in communication the oil flow passage; an edge of an inner side of the oil flow opening is provided with an oil inlet slot in communication with the oil flow opening;

a lower end of the hollow column is inserted with a reversing valve, the reversing valve includes a valve core that is capable of moving axially inside the hollow column; the valve core is provided with a valve rod and a valve head arranged at an upper end of the valve rod; an outer sidewall of the valve head abuts an inner wall of the inner cavity, and the valve head is circularly provided with a ring slot in communication with the oil flow opening; there is a gap between the valve rod and the inner wall of the inner cavity, and a step recessing inwards and configured to communicate the inner cavity with the oil flow opening is formed between a lower end of the valve head and the valve rod.

Preferably, the buffering assembly includes an elastomer, a spacer and an elastic diaphragm which are laminated inside the cavity in sequence; an edge of the elastic diaphragm is fastened to an inner wall of the cavity to form a seal.

Furthermore, a lower end of the oil distributor is provided with a damping hole, and the damping hole is aligned with the top end of the elastic oil bag, and is in communication with the cavity and the elastic oil bag respectively.

Furthermore, an aperture of the damping hole is smaller than a caliber of the opening of the upper end of the elastic oil bag.

Preferably, the reversing valve further includes a magnetic steel arranged on an outer side of a top end of the hollow column, a spring fixedly connected to a bottom end of the valve rod, a sleeve column sheathed around a periphery of the hollow column, and a winding coil sheathed around a periphery of the sleeve column.

Preferably, a bottom end of the valve rod is provided with a valve tail, an outer sidewall of the valve tail abuts an inner wall of the sleeve column, and the valve tail is provided with an oil flow slot in communication with the sleeve column.

Furthermore, a connecting pipe is fixedly connected to a bottom end of the sleeve column; the spring is arranged inside the connecting pipe, and the connecting pipe is in communication with the sleeve column through the oil flow slot.

Preferably, a bottom end of the connecting pipe is in communication with an elastic bellows.

Preferably, the steering motor includes a plurality of the cylinder assemblies; each of the cylinder assemblies is positioned under the oil distributor, and is arranged in circular inside the steering motor.

Furthermore, the spring damping valve is butterfly-shaped; the oil distributor and the spring damping valve are fitted with each other to form a seal through a fastener.

Beneficial Effect

Compared with the prior art, the steering motor provided by the present application utilizes a combined design of oil passages therein, thereby simplifying the structure of the steering motor, and utilizes an elastic oil bag, which reduces friction and wear of the shock absorption mechanism, prolongs the service life of the steering motor and saves cost.

DETAILED DESCRIPTION OF THE PREFERRED EMBODIMENT

Figure 1:
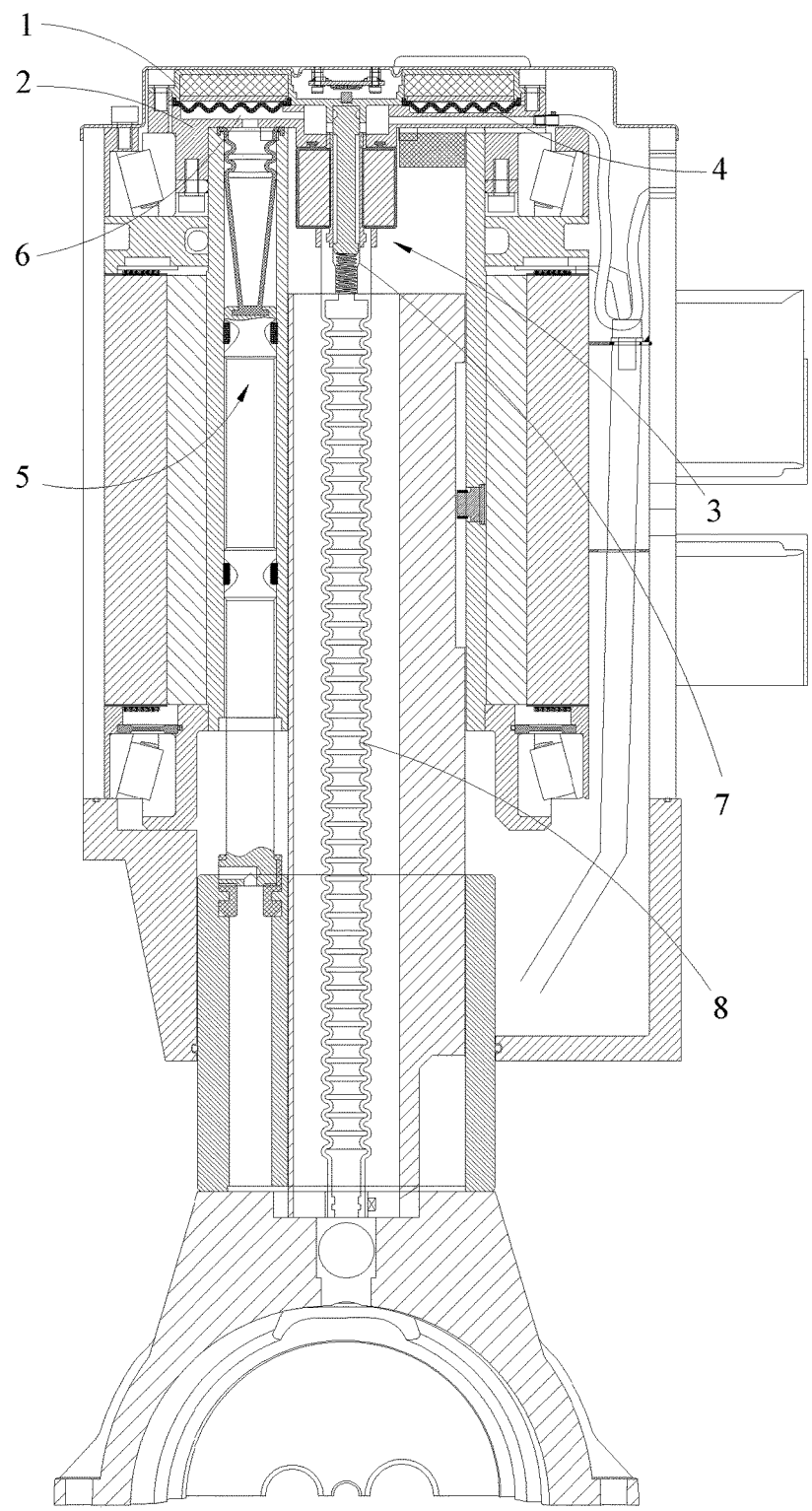
FIG. 1 is a sectional schematic view of a steering motor provided by an embodiment of the present application.
Figure 2:
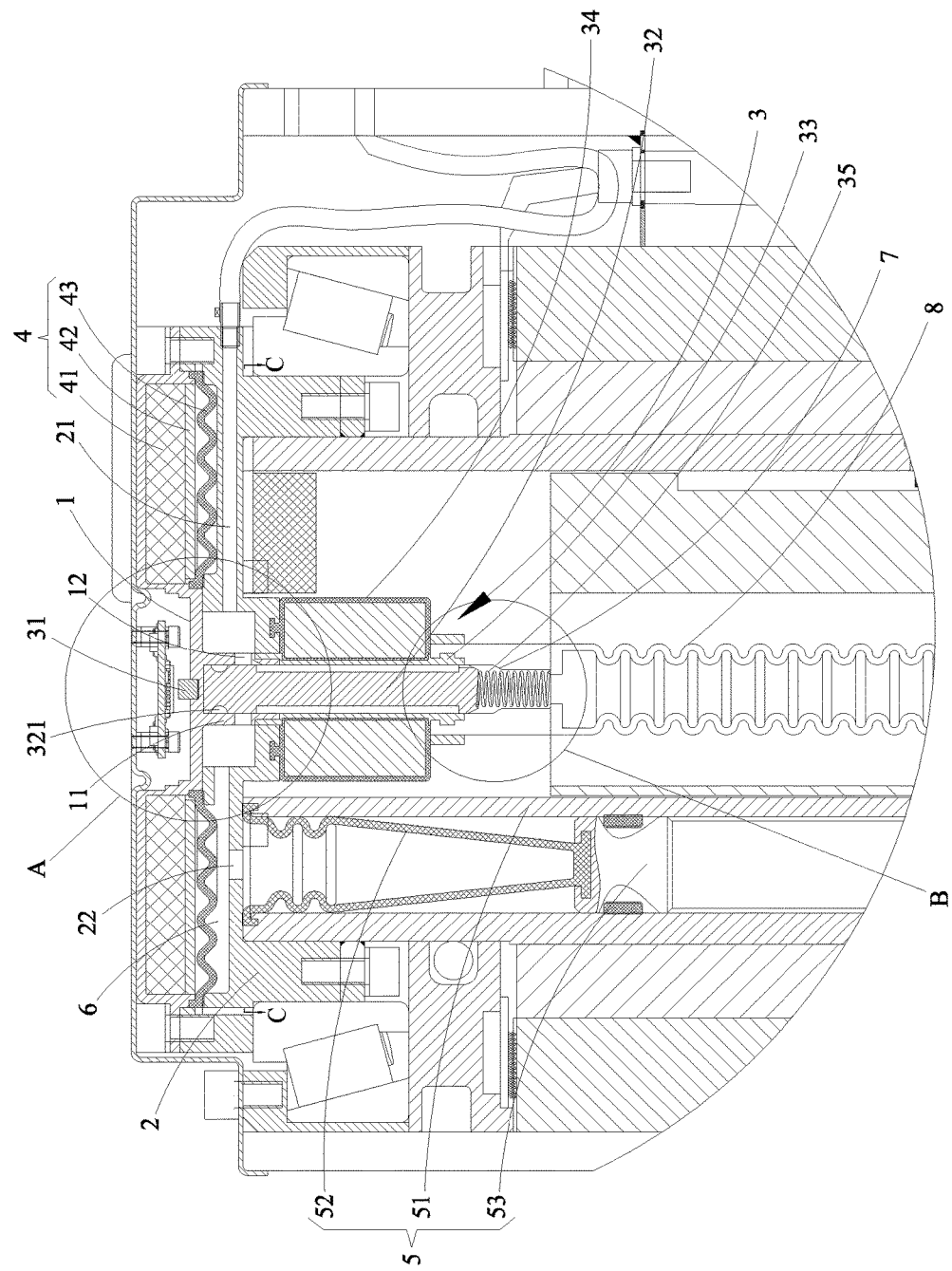
FIG. 2 is a partially enlarged schematic view of FIG. 1.
Figure 3:
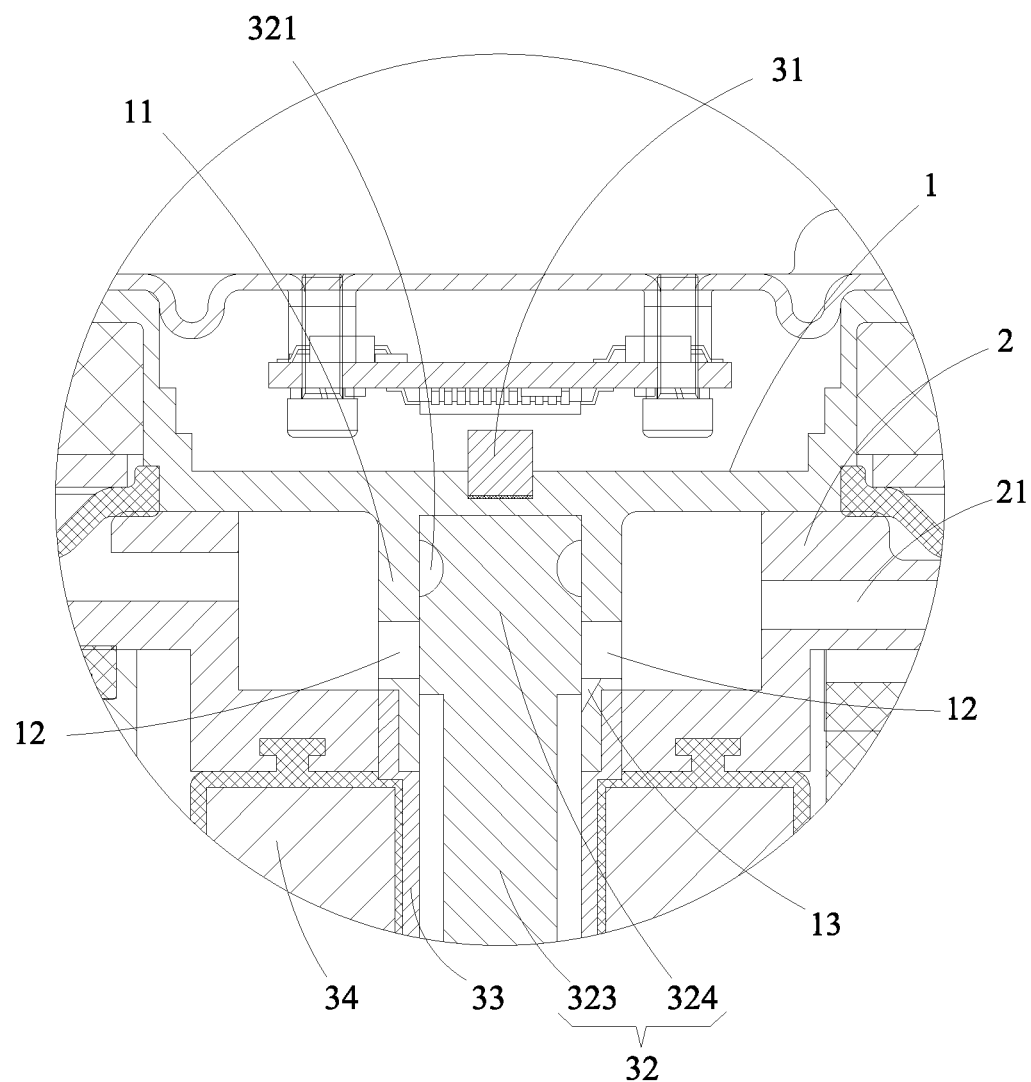
FIG. 3 is an enlarged schematic view of the portion A in FIG. 2.

In order to make the purposes, technical solutions, and advantages of the present application clearer, the present application will be further described in detail hereinafter with reference to accompanying drawings and embodiments. It should be understood that the specific embodiments described herein are merely intended to explain but not to limit the present application.

The implementation of the present application will be described in detail hereinafter with reference to the following specific embodiments.

As shown in FIGS. 1-6, the present application provides a preferred embodiment.

The embodiment provides a steering motor which includes a spring damping valve 1 and an oil distributor 2; wherein the oil distributor 2 is arranged under the spring damping valve 1, and the spring damping valve 1 and the oil distributor 2 are fitted with each other to form a sealed cavity 6; the cavity 6 is provided therein with a buffering assembly 4 configured to cooperate with oil fluid to buffer shocks.

An upper end of the oil distributor 2 is provided with an oil flow passage 21 defining an opening at one end thereof along a radial direction of the oil distributor 2. The oil flow passage 21 is in communication with the cavity 6. A hollow column 11 arranged along an axial direction of the spring damping valve 1 extends outwards from a lower end of the spring damping valve 1, and the hollow column 11 is provided with an inner cavity and defines an opening at an outer end thereof. Furthermore, a sidewall of the hollow column 11 is further provided with a through oil flow opening 12, the oil flow opening 12 is in communication with the oil flow passage 21, and an edge of an inner side of the oil flow passage 12 is provided with an oil inlet slot 13 in communication with the oil inlet opening 12.

A lower end of the hollow column 11 is inserted with a reversing valve 3. The reversing valve 3 has a valve core 32, and the valve core 32 is capable of moving axially in an inner cavity of the hollow column 11. Herein, the valve core 32 is provided with a valve rod 323 and a valve head 324 arranged at an upper end of the valve rod 323. An outer sidewall of the valve head 324 abuts an inner wall of the inner cavity of the hollow column 11, and the valve head 324 is circularly provided with a ring slot 321 which is in communication with the oil flow passage 21. There is a gap between the valve rod 323 and the inner wall of the inner cavity of the hollow column 11, and a step recessing inwards is formed between a lower end of the valve head 324 and the valve rod 323; the step is configured to communicate the oil inlet slot 13 and the oil flow opening 12 with the inner cavity of the hollow column 11.

As described above, the oil flow passage 21 is in communication with the oil flow opening 12 and the cavity 6 so as to form an oil passage. The oil passage is configured for the oil supply to a steering motor hydraulic damping system. The oil flow passage 21 is in communication with the oil flow opening 12, the oil inlet slot 13, and the inner cavity of the hollow column 11 so as to form another oil passage which is configured for the oil supply for braking oil supply and hoisting oil supply of a steering motor. By upward and downward movements of the valve core 32 of the reversing valve 3 in the inner cavity of hollow column 11, and cooperation among the oil flow opening 12 and the oil inlet slot 13, a non-interference switch between the two oil passages can be realized.

A cylinder assembly 5 is fixedly arranged under the oil distributor 2; the cylinder assembly 5 includes a cylinder 51, an elastic oil bag 52 and a piston 53. Two ends of the cylinder 51 are provided with openings. An upper opening of the cylinder 51 is abutted against a lower surface of the oil distributor 2, and both the elastic oil bag 52 and the piston 53 are arranged in the cylinder 51; the elastic oil bag 52 is a saccular elastic diaphragm with an opening defined at an upper end thereof, and an edge of the upper opening of the elastic oil bag 52 is fixedly connected to an inner wall of an upper opening of the cylinder 51, thereby forming a seal for the upper opening of the cylinder 51. Furthermore, the upper opening of the elastic oil bag 52 is in communication with the cavity 6. Additionally, the piston 53 is fixedly connected to the lower end of the elastic oil bag 52, and the piston 53 is arranged in the cylinder 51 and capable of sliding axially along an inner cavity of the cylinder 51.

When the steering motor shakes, the piston 53 slides upwards and downwards in the cylinder 51 along with shocks of the steering motor; the elastic oil bag 52 is driven by the sliding to be stretched or compressed. When the elastic oil bag 52 is compressed, the oil fluid inside the elastic oil bag 52 will be squeezed out and flows into the cavity 6, then the oil fluid compresses the buffering assembly 4 and makes the buffering assembly 4 generate an elastic deformation, thereby buffering the shocks. When the elastic oil bag 52 is stretched, the oil fluid in the cavity 6 will flow back into the elastic oil bag 52, and the buffering assembly 4 recovers from the deformation.

The adoption of the aforesaid steering motor has the following features:

1) The spring damping valve 1 and the oil distributor 2 are fitted with each other to form a sealed cavity 6 which is communication with the oil flow passage 21. The hollow column 11 with the oil flow opening 12 is protruded from under the oil distributor 2, and the hollow column 11 is in communication with the oil flow passage 21 through the oil flow opening 12. The inner cavity of the hollow column 11 is inserted with the reversing valve 3 which moves in the inner cavity of the hollow column 11 through the valve core 32, such that the oil flow passage 21 is divided into two branch oil passages which are independent of each other. This design reduces the space occupied by the two oil passages, simplifies the structure of the steering motor, and saves resources as well as cost.

2) The sealed cavity 6 is formed by fitting the spring damping valve 1 with the oil distributor 2; a buffering assembly 4 is arranged inside the cavity 6, and the cylinder assembly 5 docked with the cavity 6 is arranged under the oil distributor 2. Through the sealed communication between the elastic oil bag 52 of the cylinder assembly 5 and the cavity 6, the defect that components of the cylinder assembly 5 in a traditional hydraulic damping mechanism are prone to wear and sensitive to temperature has been overcome by the elastic oil bag 52, thereby prolonging the service life of the steering motor and saving cost.

In this embodiment, the purpose of providing the buffering assembly 4 is to achieve buffer and damping by elastic deformation thereof. The buffering assembly 4 includes an elastomer 41, a spacer 42 and an elastic diaphragm 43. Wherein, the elastomer 41, the spacer 42 and the elastic diaphragm 43 are laminated inside the cavity 6 in sequence from top to bottom. Furthermore, an edge of the elastic diaphragm 43 is fixedly connected to an inner wall of the cavity 6 to form a seal; therefore, the elastomer 41 and the spacer 42 are sealed by the elastic diaphragm 43 inside a chamber formed by an inner wall of the cavity 6 and the elastic diaphragm 43. Herein, the elastomer 41 and the spacer 42 can move inside the chamber. Surely, in other embodiments, according to actual conditions and requirements, each component of the buffering assembly 4 can be arranged in other orders, and the buffering assembly 4 can be of other types of buffering structures.

An undersurface of the oil distributor 2 is provided with a damping hole 22, and the damping hole 22 is arranged to be aligned with the upper opening of the elastic oil bag 52, in this way, the elastic oil bag 52 is in communication with the cavity 6 through the damping hole 22. Surely, in other embodiments, the elastic oil bag 52 can be in hermetical communication with the cavity 6 in other ways, such as a pipe connection or a passage connection, etc.

Furthermore, an aperture of the damping hole 22 is smaller than a caliber of the upper opening of the elastic oil bag 52. In this way, when the elastic oil bag 52 is compressed by the aforesaid piston 53, the oil fluid inside the elastic oil bag 52 will be squeezed out and flows into the cavity 6 through the damping hole 22. The damping hole 22 thus provides a damping buffer function. Surely, this is just one buffering form; in other embodiments, according to actual conditions, other buffering forms can also be adopted.

In this embodiment, the reversing valve 3 is an electromagnetic reversing valve. The reversing valve 3 further includes a magnetic steel 31, a sleeve column 33, a winding coil 34 and a spring 35; specifically, the magnetic steel 31 is fixedly provided on an outer side of a top end of the hollow column 11, the sleeve column 33 is sheathed around a periphery of a bottom end of the hollow column 11, the winding coil 34 is sheathed around a periphery of the sleeve column 33, and the spring 35 is fixedly connected to a bottom end of the valve rod 323 of the valve core 32. Surely, in other embodiments, according to actual conditions and requirements, other types of reversing valves can also be adopted.

In the original state, the valve core 32 is absorbed by the magnetic steel 31; the ring slot 321 on the outer wall of the valve head 324 and the oil flow opening 12 of the hollow column 11 are staggered; the oil flow opening 12 is blocked by an outer wall of the valve head 324. Now, the oil inlet slot 13 is in communication with the oil flow passage 21 through the oil flow opening 12, that is, an oil passage formed by the oil flow passage 21 and the inner cavity of the hollow column 11 forms a clear passage, and an oil passage formed by the oil flow passage 21, the cavity 6 and the elastic oil bag 52 is blocked. When the winding coil 34 is electrified, the whole valve core 32 moves downwards, the valve rod 323 compresses the spring 35, and the ring slot 321 at the outer wall of the valve head 324 is aligned with and in communication with the oil flow opening 12; the oil inlet slot 13 is blocked by an outer wall of a lower end of the valve head 324, in this way, the oil passage formed by the oil flow passage 21, the cavity 6 and the elastic oil bag 52 forms a clear passage; at the same time, the oil passage formed by the oil flow passage 21 and the inner cavity of the hollow column 11 is blocked. In this way, the reversing and switch function of the reversing valve 3 achieves a switch between the two oil passages, without interference.

A center of the oil distributor 2 is provided with a circular hole 23. When the spring damping valve 1 is fitted with the oil distributor 2, the hollow column 11 at the center of the spring damping valve 1 is inserted into the circular hole 23 to form a fit. Furthermore, an upper end of the sleeve column 33 sheathed around a periphery of a lower end of the hollow column 11 is also inserted into the circular hole 23.

Figure 4:
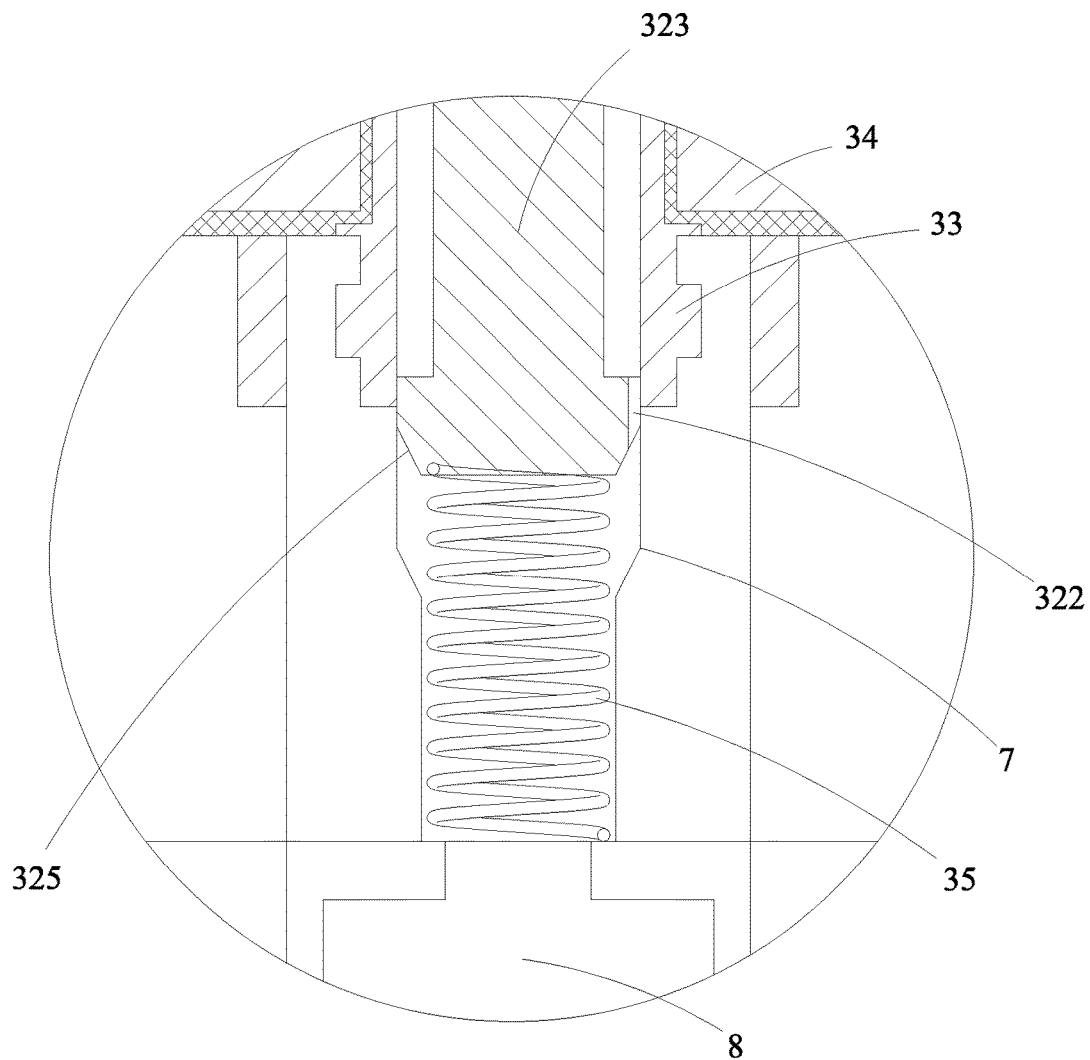
FIG. 4 is an enlarged schematic view of the portion B in FIG. 2.
Figure 5:
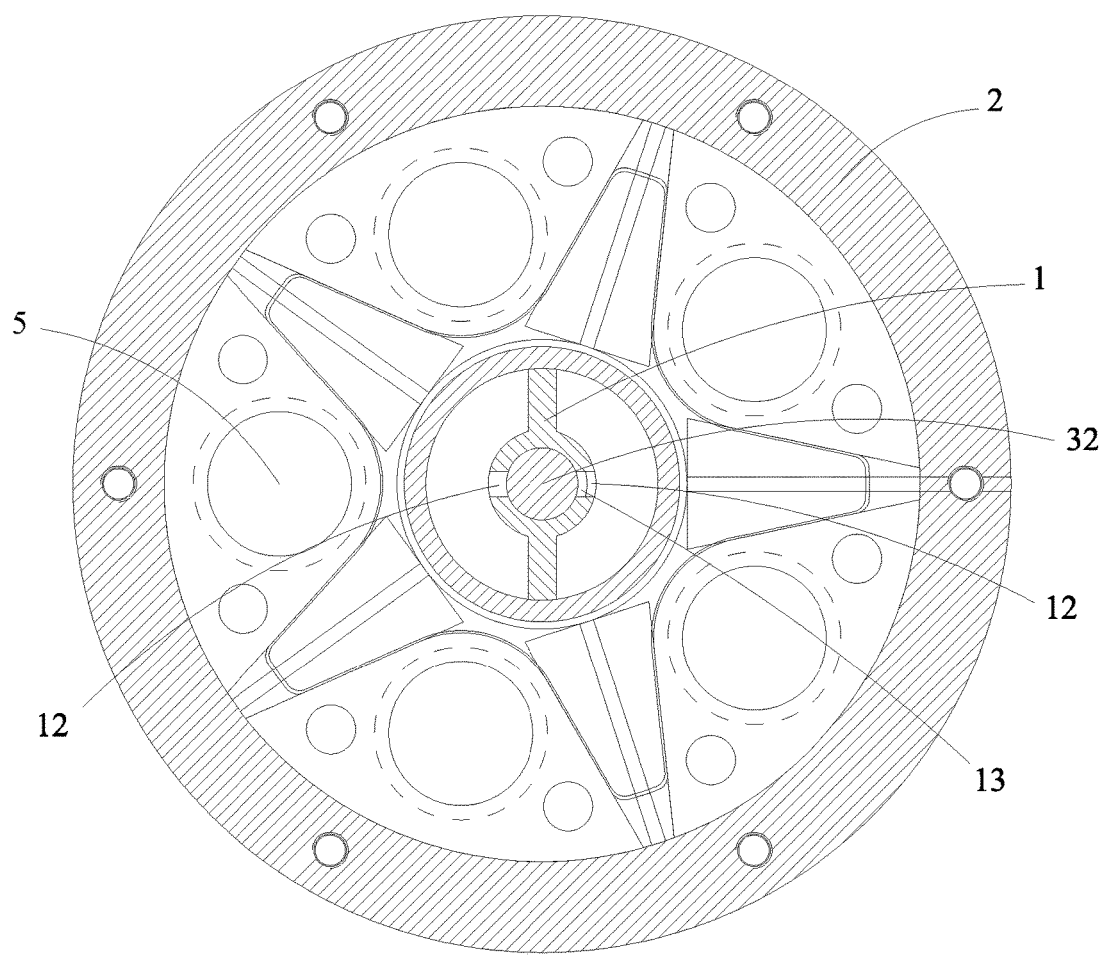
FIG. 5 is a sectional schematic view along the cutting direction C-C of FIG. 2.
Figure 6:
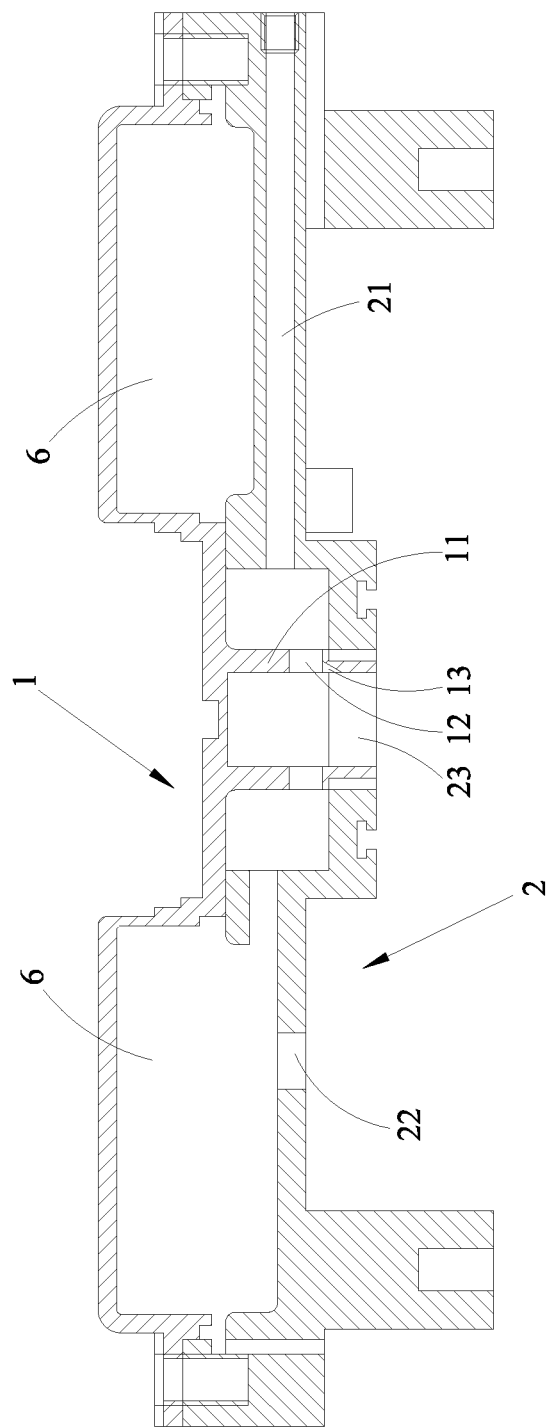
FIG. 6 is a sectional schematic view of the assembly of the spring damping valve and the oil distributor of the steering motor provided by an embodiment of the present application.

Referring FIG. 4, in the embodiment, a bottom end of the valve rod 323 is provided with a valve tail 325, an outer sidewall of the valve tail 325 abuts an inner wall of the sleeve column 33, and an outer sidewall of the valve tail 325 is provided with an oil flow slot 322 which is in communication with the sleeve column 33.

Specifically, a connecting pipe 7 is fixedly connected to a bottom end of the sleeve column 33; the spring 35 is arranged inside the connecting pipe 7. Furthermore, an opening of the connecting pipe 7, the valve tail 325, and the sleeve column 33 are sealed. In this way, by the oil flow slot 322 of the valve tail 325, the connecting pipe 7 is in communication with the sleeve column 33. Surely, in other embodiments, the sleeve column 33 and the connecting pipe 7 can be communicated with each other in other ways.

In the embodiment, a bottom end of the connecting pipe 7 is communicated hermetically with a hollow elastic bellows 8. In this way, the oil flow passage 21, the hollow column 11, the sleeve column 33, the connecting pipe 7, and the elastic bellows 8 form a clear passage, and this passage serves as an oil passage for braking oil supply of a steering motor and an oil passage for hoisting oil supply of a steering motor.

In the embodiment, the steering motor is provided therein with a plurality of the cylinder assemblies 5; each group of the cylinder assemblies 5 are positioned under the oil distributor 2; upper ends of each group of cylinder assemblies 5 are all abutted with a lower surface of the oil distributor 2. Naturally, each elastic oil bag 52 of each group of the cylinder assemblies 5 is in communication with the cavity 6 through the damping hole 22. Furthermore, each of the cylinder assemblies 5 is arranged in circular inside the steering motor. Surely, in other embodiments, the number of the cylinder assemblies 5 can be determined according to the actual conditions, and each group of the cylinder assemblies 5 can also be arranged in other forms.

In the embodiment, the spring damping valve 1 is butterfly-shaped. Naturally, the structure of the oil distributor 2 matches with and corresponds to the structure of the spring damping valve 1; the oil distributor 2 and the spring damping valve 1 are sealed and connected hermetically through a fastener. Surely, in other embodiments, according to actual conditions and requirements, the spring damping valve 1 and the oil distributor 2 can also adopt other types of structures.

Furthermore, a traditional steering motor is generally provided therein with a containing slot, and oil pipelines and cables are arranged inside the containing slot. However, when the steering motor is working, the oil pipelines and the cables may be rubbed against the slot wall of the containing slot due to constant rotations and are very prone to wear. Inside the steering motor provided by this embodiment, each of the oil pipelines and the cables is arranged in hang. Therefore, when the steering motor is working, the oil pipelines and the cables swing back and forth, thereby avoiding damages due to friction and saving cost.

The above contents are only preferred embodiments of the present invention, and are not intended to limit the present invention. Any improvements, equivalent replacements and modifications made within the spirit and principle of the present invention should be contained within the protection scope of the present invention.

What is claimed is:

1. A steering motor, wherein the steering motor comprises a spring damping valve and an oil distributor; the oil distributor is arranged under the spring damping valve and fitted with the spring damping valve to form a cavity; a buffering assembly is arranged inside the cavity;
    a cylinder assembly is fixedly arranged under the oil distributor; the cylinder assembly comprises a cylinder with openings defined at two ends thereof, and an elastic oil bag arranged in the cylinder and defining an opening at an upper end thereof; the upper end of the elastic oil bag is fixedly connected to an inner wall of the cylinder and communicated with the cavity; the cylinder is further provided therein with a piston that slides axially along the cylinder; the piston is connected to a lower end of the elastic oil bag;
    the oil distributor is provided with an oil flow passage arranged radially and in communication with the cavity; a hollow column that is arranged axially extends outwards at a lower end of the spring damping valve; the hollow column is provided with an inner cavity and a sidewall of the hollow column is provided with an oil flow opening in communication the oil flow passage; an edge of an inner side of the oil flow opening is provided with an oil inlet slot in communication with the oil flow opening;
    a lower end of the hollow column is inserted with a reversing valve, the reversing valve comprises a valve core that is capable of moving axially inside the hollow column; the valve core is provided with a valve rod and a valve head arranged at an upper end of the valve rod; an outer sidewall of the valve head abuts an inner wall of the inner cavity, and the valve head is circularly provided with a ring slot in communication with the oil flow opening; there is a gap between the valve rod and the inner wall of the inner cavity, and a step recessing inwards and configured to communicate the inner cavity with the oil flow opening is formed between a lower end of the valve head and the valve rod.

2. The steering motor of claim 1, wherein the buffering assembly comprises an elastomer, a spacer and an elastic diaphragm which are laminated inside the cavity in sequence; an edge of the elastic diaphragm is fastened to an inner wall of the cavity to form a seal.

3. The steering motor of claim 2, wherein the reversing valve further comprises a magnetic steel arranged on an outer side of a top end of the hollow column, a spring fixedly connected to a bottom end of the valve rod, a sleeve column sheathed around a periphery of the hollow column, and a winding coil sheathed around a periphery of the sleeve column.

4. The steering motor of claim 1, wherein a lower end of the oil distributor is provided with a damping hole, and the damping hole is aligned with the top end of the elastic oil bag, and is in communication with the cavity and the elastic oil bag respectively.

5. The steering motor of claim 4, wherein the reversing valve further comprises a magnetic steel arranged on an outer side of a top end of the hollow column, a spring fixedly connected to a bottom end of the valve rod, a sleeve column sheathed around a periphery of the hollow column, and a winding coil sheathed around a periphery of the sleeve column.

6. The steering motor of claim 4, wherein an aperture of the damping hole is smaller than a caliber of the opening of the upper end of the elastic oil bag.

7. The steering motor of claim 6, wherein the reversing valve further comprises a magnetic steel arranged on an outer side of a top end of the hollow column, a spring fixedly connected to a bottom end of the valve rod, a sleeve column sheathed around a periphery of the hollow column, and a winding coil sheathed around a periphery of the sleeve column.

8. The steering motor of claim 1,
    wherein the reversing valve further comprises a magnetic steel arranged on an outer side of a top end of the hollow column, a spring fixedly connected to a bottom end of the valve rod, a sleeve column sheathed around a periphery of the hollow column, and a winding coil sheathed around a periphery of the sleeve column.

9. The steering motor of claim 8, wherein a bottom end of the valve rod is provided with a valve tail, an outer sidewall of the valve tail abuts an inner wall of the sleeve column, and the valve tail is provided with an oil flow slot in communication with the sleeve column.

10. The steering motor of claim 9, wherein a connecting pipe is fixedly connected to a bottom end of the sleeve column; the spring is arranged inside the connecting pipe, and the connecting pipe is in communication with the sleeve column through the oil flow slot.

11. The steering motor of claim 10, wherein a bottom end of the connecting pipe is in communication with an elastic bellows.

12. The steering motor of claim 1, wherein the steering motor comprises a plurality of the cylinder assemblies; each of the cylinder assemblies is positioned under the oil distributor, and is arranged in circular inside the steering motor.

13. The steering motor of claim 12, wherein the spring damping valve is butterfly-shaped; the oil distributor and the spring damping valve are fitted with each other to form a seal through a fastener.

* * * * *